United States Patent Office 3,395,028
Patented July 30, 1968

3,395,028
WAX COMPOSITION AND METHOD FOR
MAKING THE SAME
Leonard Mackles, New York, N.Y., assignor to The
Drackett Company, Cincinnati, Ohio, a corporation of Delaware
No Drawing. Filed Sept. 12, 1966, Ser. No. 578,491
11 Claims. (Cl. 106—8)

ABSTRACT OF THE DISCLOSURE

An aerosol wax and silicone oil furniture polish which is a double emulsion consisting of a water-in-oil emulsion in which the outer oil phase contains the organic solvent and wax; the inner water phase has emulsified therein the silicone oil.

This invention relates to an aerosol wax composition and to a method for its manufacture. More particularly, it relates to a composition of this character which is especially suitable for use as a furniture polish and which exhibits improved shine and stability characteristics.

A variety of the so-called aerosol or self-spraying wax compositions are known in the prior art. These, however, leave much to be desired both as to their shine producing characteristics and their stability. Moreover, these usually require a substantial amount of buffing after application to produce an adequate shine.

It is an object of the present invention to provide an aerosol wax composition which is stable in the container and which provides a good shine when applied to a surface.

It is another object of the present invention to provide a wax composition of the above-mentioned type which when applied requires substantially no buffing.

It is a further object of the present invention to provide a process for preparing the compositions of the above objects.

Other and more detailed objects will be apparent from the following description and claims.

It has now been found that the above objects can be obtained by formulating the aerosol wax composition so that it comprises a water-in-oil emulsion in which substantially all of the wax is in the continuous phase (i.e., the oil phase) and which is further characterized by the fact that a silicone fluid is further emulsified in said discontinuous phase (i.e., the aqueous phase). This product can thus be described as a double emulsion which can be visualized as a continuous oil phase in which are distributed droplets of the aqueous phase and in which in turn there is contained still smaller droplets of a silicone fluid.

In accordance with this invention it has been discovered that when the silicone fluid, which is thought to be the major shine-producing ingredient of this composition, is incorporated in the internal water phase, an unusually high degree of shine is imparted to furniture to which this composition is applied. This degree of shine is not obtainable when an equivalent amount of the silicone fluid is added to the continuous oil phase. It has also been found that for optimum performance, the use of a solvent of high volatility as a vehicle for the waxes in the continuous phase is highly important.

The continuous oil phase herein referred to as the "outer oil phase" designates the outer phase of the complete composition as it exists in the aerosol container after the propellant system has been added. This comprises a solvent vehicle partly made up of liquified gaseous propellant and preferably partly made up of a highly volatile solvent. Coating materials, such as waxes or oils, are dissolved or intimately distributed in said outer oil phase.

The continuous oil phase to which the propellant has not yet been added is preferred to herein as the "preliminary outer oil phase." The latter is prepared by mixing one or more wax coating materials in the highly volatile solvent at elevated temperatures until complete solution or distribution of said preliminary outer oil phase. The preferred waxes employed will generally be characterized as having a melting point between 110–195° F., being at least partially soluble in aliphatic hydrocarbon solvents, insoluble in lower molecular weight alcohols, and having good film-forming properties and water resistance.

By way of example the following waxes may be mentioned: microcrystalline waxes, oxidized microcrystalline waxes, paraffin wax, carnauba wax, beeswax, ceresin wax, etc.

The quantity of wax that will be incorporated in the present composition can vary widely depending upon the particular wax or waxes selected and the character of the product desired. In general, however, it may comprise about 0.1 to 10% by weight of the *total* composition.

One or more oils may be added to said wax in the preliminary outer oil phase as an adjunct which, although not absolutely essential, adds advantageous properties to the composition. As used herein, the term "oil" refers to oils of mineral, animal or vegetable origin and is distinguished from such synthetic materials as silicone fluids that are sometimes referred to as silicone oils. The oils that may be incorporated in the preliminary outer oil phase of the present invention can be any of a number of oils which are ordinarily employed in furniture polishes. By way of example the following may be mentioned: white mineral oils, castor oil, linseed oil, safflower oil, spindle oil, sperm oil, etc. The quantity of oil employed will likewise vary in amount depending on the particular oil selected and result required. In general, however, it will constitute between 0.1 and 10% by weight of the total composition.

In preparing the preliminary outer oil phase of this invention, the wax with or without the oil is dissolved in or intimately distributed in a solvent which is preferably a highly volatile solvent. Any of a variety of solvents are known in the prior art which meet this requirement. Any of these may be used.

In a preferred form of this invention, the solvent employed may be more specifically characterized as (a) having a boiling point less than about 300° F., (b) having a Kauri-Butanol value (A.S.T.M. Method D–1133) less than about 40, and (c) an evaporation rate (A.S.T.M. Method D–1078) less than about 20. Typical examples include the following: hexane, heptane, octane, VM&P naphtha, Isopar E. Isopar C, etc.

The quantity of the solvent employed will of course depend on the particular wax employed and the solubility of the wax therein. In general, however, the solvent will constitute from about 5.0 to 75% by weight of the total composition.

In preparing the composition of the present invention, it is advantageous to form the preliminary outer oil phase into a water-in-oil emulsion prior to incorporating the rein silicon fluid emulsion. This may be accomplished by dispersing water in said preliminary outer oil phase with the aid of a water/oil emulsifier. Any of a variety of emulsifiers of this character are known in the prior art which are suitable for the present purpose. By way of illustration the following may be mentioned: Arlacel C (sorbitan sesquioleate) (Atlas Chemical); Emcol 511 (tall oil acid alkanolamides) (Witco Chemical); Emcol 14 (polyglycerol oleate) (Witco Chemical); and Monamid 908 (tall oil acid alkanolamides) (Mona Ind.).

The amount of emulsifier employed will be sufficient to adequately disperse the water in the oil and will vary with the particular materials selected for use. Usually, however, this will constitute between about 0.25 to 5.0% by weight of the total composition.

The quantity of water that is utilized in making the preliminary water-in-oil emulsion is of no great critical significance. Ordinarily, it will make up between 10.0 to 90.0% by weight of the total composition.

It is a feature of the present invention to incorporate in the water-in-oil emulsion formula, described above, an emulsion of silicon fluid-in-water. It was found, quite unexpectedly that when said silicone fluid-in-water emulsion (which is an oil-in-water emulsion) was mixed with said water-in-oil emulsion, that the silicon fluid became distributed in the water phase of said water-in-oil emulsion as a discontinuous phase.

Any of a variety of silicone fluids may be used in accordance with the present invention. These will usually be oily polysiloxanes and more particularly homopolymers or copolymers of siloxanes of formula: $R_3SiO\ [R_2SiO]_n\ SiR_3$ in which R is defined as a monovalent hydrocarbon group, preferably free of aliphatic carbon to carbon multiple bonds. R need not be the same throughout the molecule.

The $n$ in the formula is a whole number generally of the order of 50–1000. In a preferred form of this invention the silicone fluids utilized are dimethylpolysiloxanes which have a viscosity in the range of from about 50 to 20,000 centistokes. However, optimum results are obtained with dimethylpolysiloxanes having a viscosity in the range of from about 1500 to 2000 centistokes.

As noted above, the silicone fluid is used in this invention in the form of a silicon fluid-in-water emulsion. A variety of emulsions of this type can be prepared using conventional and well-known emulsifying agents. Moreover, a variety of ready prepared silicone emulsions available on the market can be utilized. Of special utility are the so-called "sheer-unstable" silicone emulsions which are characterized by the fact that the emulsion is broken when the material is applied to a surface and rubbed thus releasing the silicone. The emulsions are generally made using about 3% by weight of non-ionic emulsifiers. A typical emulsion of this type is sold on the market by Union Carbide under the trade designation Silicon Emulsion LE 462. This is a 35% aqueous emulsion of dimethylpolysiloxane, said polysiloxane having a viscosity of about 1500 centistokes.

The quantity of silicone fluid, i.e., polysiloxane, that is incorporated in the composition of the present invention can also vary considerably depending upon the particular nature of the product desired. In general, however, it will constitute between about 0.1 to 10% by weight of the total finished product.

The procedures for preparing the compositions of the present invention are unique. When an oil is to be added to the outer oil phase, it is first mixed with the water-in-oil emulsifying agent and a portion of the volatile solvent at elevated temperature in a first container until the oil is completely dissolved. Of course the temperature employed will not be high enough to boil-off said solvent to any substantial extent.

The wax or waxes employed are melted in a second container to which is then added the remainder of the volatile solvent that is to be used. This mixture is then added to the contents of the first container and all the ingredients are stirred until all the wax is dissolved.

The bulk of the water employed is then heated in a separate container and slowly added with high speed agitation to wax-oil-emulsifier-volatile solvent prepared as described above. This is followed by the addition of a prepared silicone emulsion. The mixture is then allowed to cool while it is being agitated.

In preparing the finished aerosol product, the composition prepared as described above is charged into an aerosol can which is then capped with an aerosol valve. The container is now filled with the propellant.

Any of a variety of propellants may be used for this purpose. They, generally, will be liquified propellant gases and particularly hydrocarbons, halogenated hydrocarbons, mixtures of hydrocarbons, mixtures of halogenated hydrocarbons or mixtures of hydrocarbons and halogenated hydrocarbon. By way of example, the following propellants or mixtures thereof can be employed: trichlorofluoromethane (Freon 11), dichlorodifluoromethane (Freon 12), dichlorotetrafluoromethane (Freon 114), propane, isobutane, and n-butane.

The propellant will be used in an amount sufficient to propel substantially the entire quantity of the composition from the container through the valve as a spray. Generally, it will constitute from 5.0 to 50% by weight of the total composition.

The final pressure that is built up in the container in accordance with the present invention can also vary considerably. However, ordinarily it will be in the range of about 20 to 40 p.s.i.g.

In addition to the components discussed above, the present composition may also contain any of the other conventional components generally added to furniture polish compositions of this character. They may include, fragrances, antistatic agents, antislip agents, abrasives, germicides, mildewcides, dyes, etc.

Although applicant does not want to be bound by any theory, it is felt that the extremely high degree of shine obtained on a surface with the composition of the present invention may be explained on the following basis. When the composition is applied to a surface, it forms a film of oils and waxes immediately, due to the high volatility of the solvent. This film is water repellent and prevents the peneration of the water phase. The silicone contained within this water phase, when released, is concentrated on the surface of the oil-wax layer and thereby its shine producing characteristic is enchanced.

The following examples are further illustrative of the present invention. It is to be understood, however, that the invention is not limited thereto.

EXAMPLE 1

A formulation having the following composition was prepared:

| | Percent by weight |
|---|---|
| (1) Oxidized microcrystalline wax (petroleum) | 2.0 |
| (2) White mineral oil | 1.0 |
| (3) Sorbitan sesquioleate (w./o. emulsifier) | 1.5 |
| (4) Isopar E solvent (Humble Oil Company) (hydrocarbon mixture of isoparaffinic hydrocarbons principally $C_8$ isomers) | 29.0 |
| (5) Silicone Emulsion LE 462 (Union Carbide) aqueous oil-in-water emulsion of dimethylpolysiloxane of viscosity 1500–2000 centistokes (35% solids) | 10.0 |
| (6) Lemon oil fragrance | .75 |
| (7) Water (deionized) | 55.75 |

Procedure (a) Mineral oil (2), emulsifier (3) and 28.3 lbs. of solvent (4) are added to a closed, jacketed kettle equipped with a high speed, high shear mixer.

(b) This is heated to 70° C. and stirred until complete solution takes place.

(c) In a separate kettle the wax (1) is melted, and the remainder of the solvent (4) is added (0.7 lb.).

(d) The mixture prepared in (c) is added to said jacketed kettle and stirred until the wax is completely dissolved.

(e) In a separate tank the water (7) is heated to 70° C.

(f) The water heated in step (e) is slowly added to the jacketed kettle with high speed agitation which is followed by the silicone emulsion (5).

(g) This is cooled with agitation to 35° C.

(h) The lemon oil fragrance (6) is added.

Eighty-five (85) parts of the above composition is charged into an aerosol can which is capped with an aerosol valve. This can was then filled with 15% by weight of propellant mixture consisting of 13 parts by weight of Freon 12 (dichlorodifluoromethane) and 2 parts by weight of propane. After filling, this package was under pressure of 36±4 p.s.i.g. at 70° F.

EXAMPLE 2

The procedure of Example 1 was followed, excepting that in place of the mixture of Freon 12 and propane as propellant, 15 parts by weight of Freon 12 alone was used as the propellant.

EXAMPLE 3

A formulation having the following composition was prepared:

| | Percent by weight |
|---|---|
| (1) Oxidized microcrystalline wax (petroleum) | 2.0 |
| (2) White mineral oil | 1.0 |
| (3) Sorbitan sesquioleate (w./o. emulsifier) | 1.5 |
| (4) Isopan E solvent (Humble Oil Company) (hydrocarbon mixture of isoparaffinic hydrocarbon principally $C_8$ isomers) | 29.0 |
| (5) Silicone Emulsion LE 462 (Union Carbide) aqueous oil-in-water emulsion of dimethylpolysiloxane of viscosity 1500–2000 centistokes (35% solids) | 15.0 |
| (6) Lemon oil fragrance | 1.0 |
| (7) Water (deionized) | 50.5 |

Procedure (a) Add ingredients (2), (3) and (4) to a closed, jacketed kettle equipped with a high speed, high shear mixer.

(b) Heat to 70° C. and stir until complete solution takes place.

(c) Melt the wax (1) and add to the kettle, stirring until the wax is completely dissolved.

(d) In a separate tank, heat the water (7) to 70° C.

(e) Add the heated water slowly with high speed agitation followed by the silicone emulsion (5).

(f) Cool with agitation to 35° C.

(g) Add the lemon oil fragrance.

Eighty-five (85) parts by weight of the above product was charged into an aerosol can which was capped with an aerosol valve. Fifteen (15) parts by weight of Freon 12 was then filled through the aerosol valve.

EXAMPLE 4

| | Percent by weight |
|---|---|
| (1) Microcrystalline wax, M.P. 145° F. | 2.0 |
| (2) Paraffin wax | 2.0 |
| (3) White mineral oil | 1.0 |
| (4) Emcol 14 (polyglycerol oleate) | 1.5 |
| (5) VM&P naphtha | 35.0 |
| (6) Silicone Emulsion LE 462 | 15.0 |
| (7) Perfume | 0.5 |
| (8) Water | 43.0 |
| | 100.0 |

Ninety (90) parts by weight of the above composition was charged into an aerosol can which was capped with an aerosol valve. Ten (10) parts by weight of propane was then filled through the aerosol valve.

EXAMPLE 5

| | Percent by weight |
|---|---|
| (1) Beeswax | 4.0 |
| (2) Castor oil, U.S.P. | 2.0 |
| (3) Emcol 511 (alkanolamide) | 2.0 |
| (4) Heptane | 30.0 |
| (5) Silicone Emulsion LE 462 | 10.0 |
| (6) Perfume | 0.75 |
| (7) Water | 51.25 |
| | 100.00 |

Eighty-five (85) parts by weight of the above product was charged into an aerosol can which was capped with an aerosol valve. Ten (10) parts by weight of Freon 12 and five (5) parts by weight of isobutane were then filled through the aerosol valve.

Although the invention has been described with reference to specific forms thereof, it will be understood that many changes and modifications may be made without departing from the spirit of this invention.

What is claimed is:

1. An aerosol wax and polysiloxane composition useful as a furniture polish comprising a water-in-oil emulsion having an outer oil phase as the continuous phase and an aqueous phase as the discontinuous phase; said outer oil phase comprising a solvent vehicle containing substantially all of the wax of said composition; said aqueous phase in turn having emulsified therein as a discontinuous phase substantially all of said polysiloxane, whereby said composition comprises a double emulsion.

2. A composition according to claim 1 wherein said solvent vehicle contains a volatile solvent.

3. A composition according to claim 2 wherein said solvent vehicle also contains aerosol propellant in which said wax is soluble.

4. A composition according to claim 3 in which an oil selected from the group consisting of mineral oils, animal oils and vegetable oils is also incorporated in said outer oil phase.

5. A composition according to claim 3 wherein said polysiloxane is a dimethylpolysiloxane having a viscosity between about 50 and 20,000 centistokes.

6. A composition according to claim 5 containing from about 0.1 to 10.0% by weight of wax; from 5 to 75% by weight of volatile solvent; from 5.0 to 50.0% by weight of propellant; from 0.1 to 10% by weight of said dimethylpolysiloxane and 10.0 to 90.0% by weight of water.

7. A composition according to claim 6 including from 0.1 to 10% by weight of an oil selected from the group consisting of mineral oils, animal oils and vegetable oils incorporated in said outer oil phase.

8. A composition according to claim 6 wherein said dimethylpolysiloxane has a viscosity between 1500 and 2000 centistokes, and said volatile solvent has a boiling point below about 300° F.

9. A composition according to claim 8 wherein substantially all of the propellant is in said outer oil phase.

10. A composition according to claim 6 wherein said volatile solvent is a hydrocarbon mixture of isoparaffinic hydrocarbons, principally $C_8$ isomers having a boiling point of less than 300° F., and a Kauri-Butanol value of less than 40, and an evaporation rate of less than 20.

11. A composition according to claim 7 wherein said volatile solvent is a hydrocarbon mixture of isoparaffinic hydrocarbons, principally $C_8$ isomers having a boiling point of less than 300° F., a Kauri-Butanol value of less than 40, and an evaporation rate of less than 20.

References Cited
UNITED STATES PATENTS

| | | | |
|---|---|---|---|
| 2,626,870 | 1/1953 | Cooke et al. | 106—10 |
| 2,676,893 | 4/1954 | Budner | 106—10 XR |
| 2,799,599 | 7/1957 | Koch | 106—10 XR |

JAMES A. SEIDLECK, *Primary Examiner.*

J. B. EVANS, *Assistant Examiner.*